Aug. 25, 1931.    H. R. WILLIAMS    1,820,549
MILK CONTAINER
Filed April 2, 1929
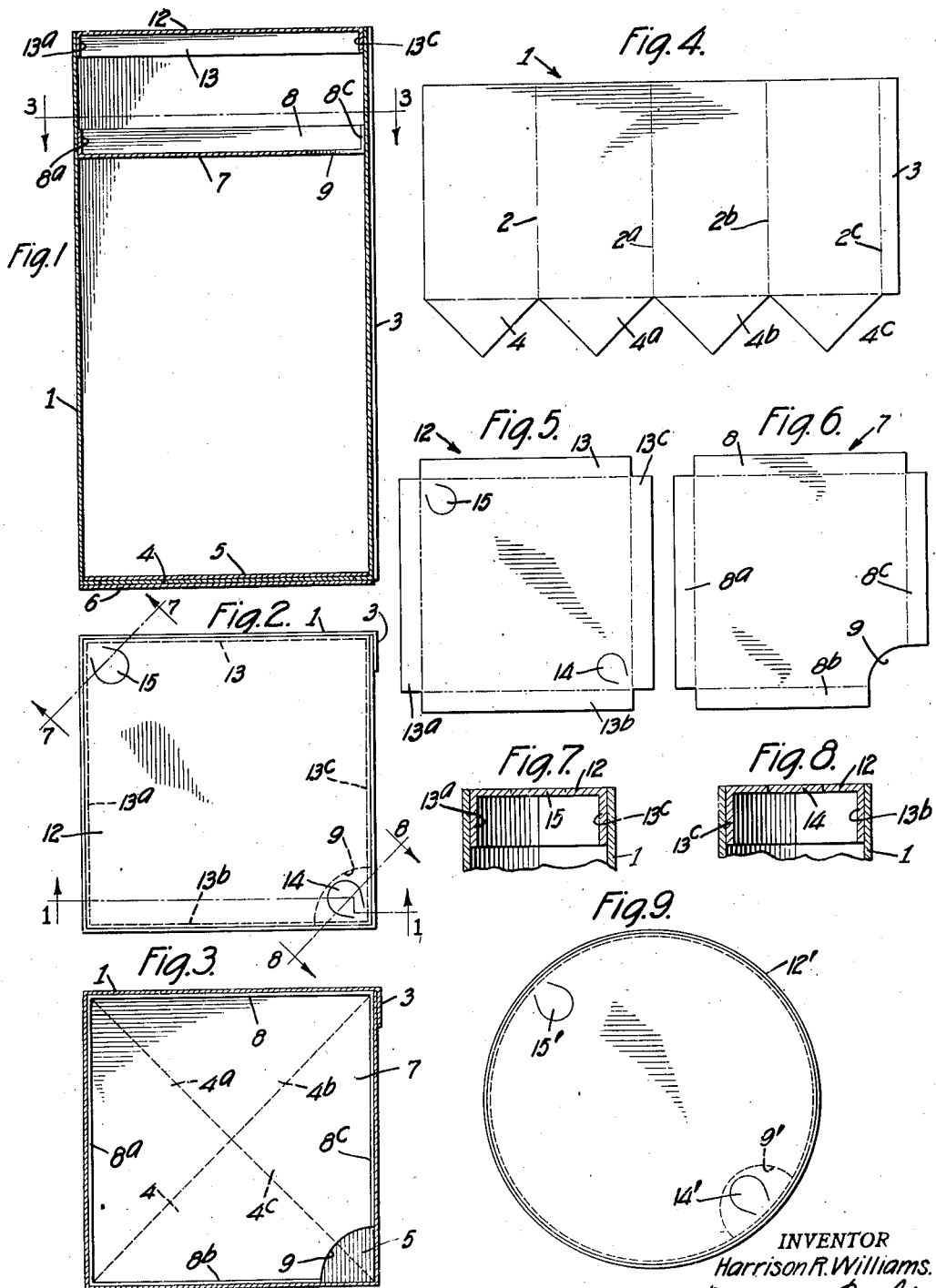
INVENTOR
Harrison R. Williams.
BY *Moses & Nolte*
ATTORNEYS Patented Aug. 25, 1931

1,820,549

UNITED STATES PATENT OFFICE

HARRISON R. WILLIAMS, OF NEW YORK, N. Y.

MILK CONTAINER

Application filed April 2, 1929. Serial No. 352,016.

This invention relates generally to so-called paper containers for liquids, and more particularly to milk containers.

One object of the invention is the provision of a container of this character which is substantial in construction and inexpensive to manufacture.

Another object is the provision of such a container having a milk compartment and a cream compartment.

A further object is the provision of communicating means between said compartments, in order to permit the cream of the whole milk to rise to the cream compartment and the milk thereof to settle to the milk compartment.

A still further object is the provision of means whereby the cream may be poured from the container in order to separate the same from the milk portion of the contents.

A still further object is the provision of means whereby, when desired, the cream and milk may be poured together from the container.

The invention will best be understood by reference to the accompanying drawings, wherein are illustrated the present preferred embodiments thereof, and in which Figure 1 is a sectional view on the line 1—1 of Figure 2, looking in the direction indicated by the arrows, and showing a container embodying one form of the invention.

Figure 2 is a top plan view of the container shown in Figure 1.

Figure 3 is a section on the line 3—3 of Figure 1.

Figure 4 is a developed view of an element comprising the side and bottom walls of a rectangular container embodying one form of the invention.

Figure 5 is a developed view of a cover element for a rectangular container embodying one form of the invention.

Figure 6 is a developed view of a partition element for a rectangular container embodying one form of the invention.

Figure 7 is a section, on an enlarged scale, on the line 7—7 of Figure 2, looking in the direction indicated by the arrows.

Figure 8 is a section, on an enlarged scale, on the line 8—8 of Figure 2, looking in the direction indicated by the arrows.

Figure 9 is a top plan view of a modified form of the invention comprising a cylindrical container.

Like reference characters indicate like parts throughout the drawings.

Referring to the drawings, a blank, indicated generally by the reference numeral 1, is stamped or otherwise cut from fibre or other suitable material, to the form shown in Figure 4; and is scored vertically in order to permit of its being bent to form the corners 2, 2a, 2b and 2c of a rectangular container, and also to form a flap 3. Casein glue or other suitable adhesive material may be applied to the flap in order to hold the side walls of the container in position. The blank 1 is also scored horizontally to permit of the bending to a common center of four triangular ends 4, 4a, 4b and 4c, each of which projects from the side-wall panels as indicated in Figure 3. Referring to Figure 1, the bottom of the container is rendered leak-proof by gluing to the upper surface of the triangular ends 4, 4a, 4b and 4c an inner bottom element 5, and to the under surface of such ends, an outer bottom element 6.

Referring to Figure 6, a blank, indicated generally by the reference numeral 7, is scored to permit of bending to form a series of tabs 8, 8a, 8b and 8c, adapted to be glued to the inner surface of the side walls, respectively, of the rectangular container, in order to form a partition at the approximate line between the cream and the milk portions of the container contents. One corner of the body of the partition element is cut away to provide an aperture 9 (Figure 1), which permits whole milk to be poured into the container, permits the cream to rise to the cream compartment 10, and also permits of the pouring of the milk from its compartment.

Referring to Figure 5, a blank, indicated generally by the reference numeral 12, is scored to permit of bending to form tabs 13, 13a, 13b and 13c, adapted to be glued to the inner surfaces of the side walls, respectively, of the rectangular container in order to form a cover therefor. In one corner of the cover blank a tongue 14 is slitted entirely through the wall. This tongue is constructed and arranged to be raised or depressed in order to fill the container with whole milk, and in order to pour the cream and milk together from the container. In the opposite corner of the cover blank a second tongue 15 is cut partially through the wall. When it is desired to pour off the cream from the container in order to separate it from the milk, this tongue 15 is forced downwardly forming an aperture through the cover and insuring that all the cream will pour before any appreciable quantity of milk leaves the container.

Figure 9 shows a top plan view of a modified form of the invention, embodying a cylindrical container of approximately the same capacity as the rectangular container shown in the remaining drawings. A circular cover member 12′ is provided with a slitted tongue 14′ and a partially slitted tongue 15′. A circular partition element is provided with an aperture 9′. While the cylindrical construction is preferable in some cases on account of its greater strength, the rectangular construction results in greater economy of shipping and storage space.

The blank shown in Figure 4 represents a very economical form from the viewpoint of material and punching costs, as the blanks may be laid out right-hand and left-hand with the apex of each triangle of one blank entering an angle of the oppositely-disposed blank. It is thus possible to cut two blanks at each stroke of the press, and the only waste of material in each pair is represented by a piece the width of the flap 3 and the length of a side of one of the triangles.

I have described what I believe to be the best embodiments of my invention. I do not wish, however, to be confined to the embodiments shown, but what I desire to cover by Letters Patent is set forth in the appended claims.

I claim:

1. A cream-separating container formed of fibrous sheet material, adapted to be thrown away after a single use, and having liquid-tight walls and divided into a plurality of communicating compartments by a fixed, apertured partition.

2. A cream-separating container of the character described formed of fibrous sheet material, adapted to be thrown away after a single use, and provided with a fixed apertured partition defining an upper cream compartment and a lower milk compartment, the volumes of the upper and lower compartments bearing about the same ratio to one another as the ratio of cream to skimmed milk in whole milk of average composition.

3. A cream-separating container provided with a partition element defining two compartments and having a marginal aperture connecting said compartments, and a cover for said container provided with an aperture in substantial registration with the aperture of said partition element.

4. A cream-separating container of the character described provided with a partition element having a marginal aperture therein and a cover element having a marginal aperture therein oppositely disposed with reference to the aperture of said partition element.

5. A container of the character described provided with an apertured partition element and a cover element, said cover element having a tongue slitted through a wall thereof and an oppositely-disposed tongue partially slitted through a wall thereof.

6. A container of the character described provided with a partition element having an aperture formed therein, and a cover element having an aperture in substantial alignment with the aperture of said partition element, and also having a partially-formed aperture substantially oppositely disposed with reference to said first-named apertures.

7. In a container of the character described, a cover element provided with a tongue slitted through a wall thereof and an oppositely-disposed tongue partially slitted through said wall.

8. A liquid container of the character described having liquid-tight walls and provided with a valved outlet aperture in a wall thereof and a second outlet aperture partially formed in a wall thereof.

9. A cream-separating container having liquid-tight walls and provided with a rectangular partition element having an aperture formed in one corner thereof.

10. A cream-separating container having liquid-tight walls and provided with a valved outlet aperture passing through a wall thereof and a second outlet aperture partially formed in a wall thereof and oppositely disposed with reference to said first-named aperture.

In testimony whereof I have affixed my signature to this specification.

HARRISON R. WILLIAMS.